United States Patent [19]
Vogt

[11] Patent Number: 5,806,716
[45] Date of Patent: Sep. 15, 1998

[54] MASS FLOW, FLUID MEASURING AND DISPENSING SYSTEM

[75] Inventor: Oliver Vogt, Green Bay, Wis.

[73] Assignee: Optima Corporation, Green Bay, Wis.

[21] Appl. No.: 705,187

[22] Filed: Aug. 29, 1996

[51] Int. Cl.[6] .................................................. B67D 5/08
[52] U.S. Cl. ............................................ 222/59; 222/61
[58] Field of Search .................................. 222/55, 63, 61, 222/59

[56] References Cited

U.S. PATENT DOCUMENTS

| | | | |
|---|---|---|---|
| 3,347,418 | 10/1967 | Fefferman | 222/61 |
| 4,331,262 | 5/1982 | Snyder et al. | 222/37 |
| 4,432,468 | 2/1984 | Siff et al. | 222/55 |
| 5,012,955 | 5/1991 | Shannon | 222/55 |
| 5,072,853 | 12/1991 | Shannon | 222/55 X |
| 5,090,594 | 2/1992 | Randall, Jr.et al. | 222/1 |
| 5,316,179 | 5/1994 | Ioannides et al. | 222/56 |
| 5,568,882 | 10/1996 | Takacs | 222/61 |

*Primary Examiner*—Kevin P. Shaver
*Attorney, Agent, or Firm*—Godfrey & Kahn, S.C.

[57] ABSTRACT

A measuring and dispensing system capable of repeatedly dispensing discrete amounts of fluid having a mass of about 10 g or less and even amounts as small as 1 g. The system includes a pressurized tank for holding a fluid medium such as a liquid pharmaceutical. The tank is coupled in fluid communication to a mass flow sensor. The mass flow sensor is designed to have fluid from the tank flow through it, and measures the mass of the flowing fluid. A controller is coupled in data transmission relation to the mass flow sensor and records each measurement made by the mass flow sensor. A dispenser, such as a flexible tube, is coupled in fluid flowing relation to the mass flow sensor. A valve, such as a pinch valve, is positioned so as to be able to stop flow out of the dispenser. The valve is coupled in data transmission relation to the controller which controls opening and closing of the valve, automatically adjusting the amount of fluid permitted to flow out of the dispenser.

14 Claims, 1 Drawing Sheet

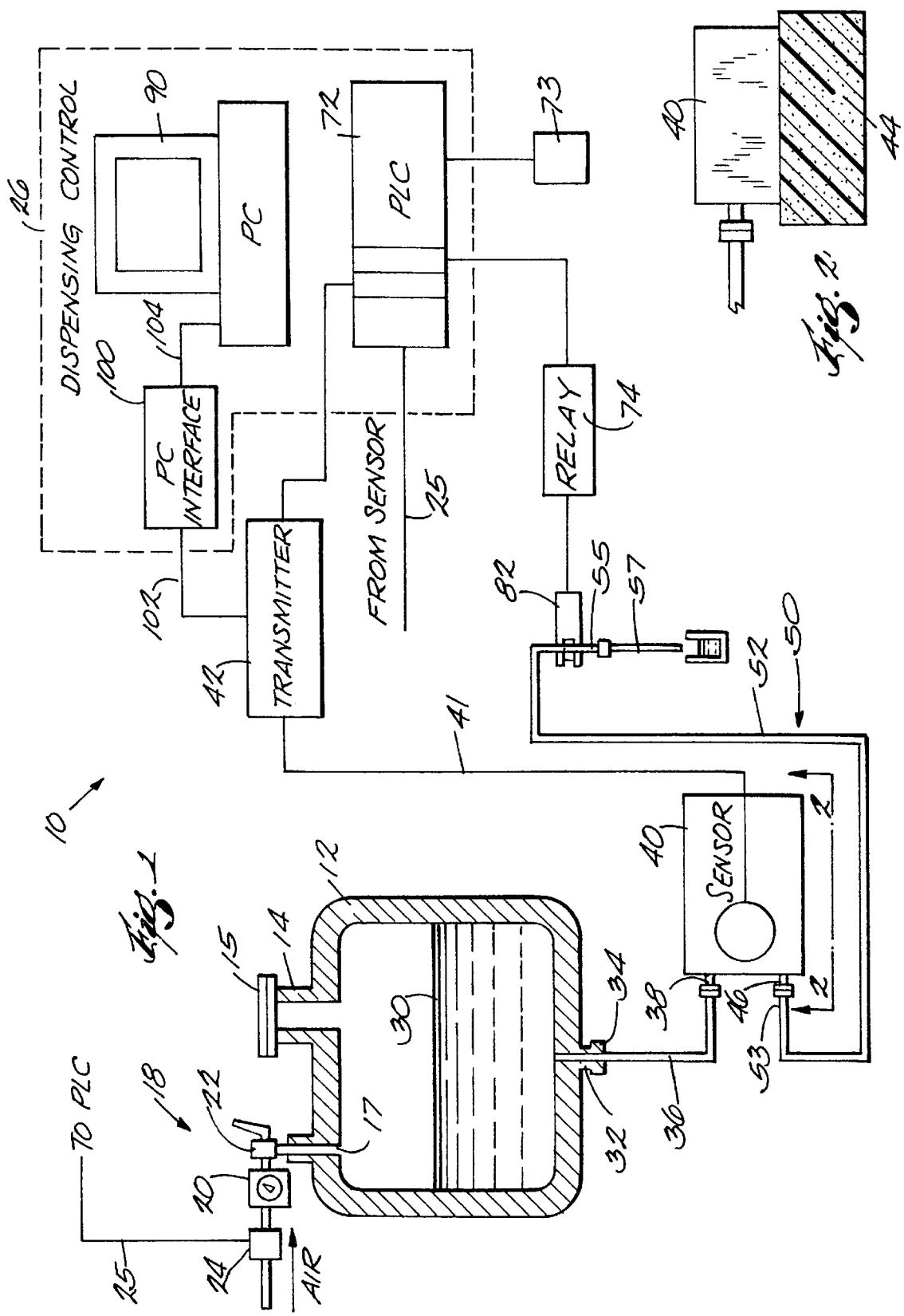

5,806,716

MASS FLOW, FLUID MEASURING AND DISPENSING SYSTEM

BACKGROUND OF THE INVENTION

The present invention relates to devices for measuring small amounts of fluids, particularly liquids, by mass. More specifically, the present invention relates to a mass flow measuring system capable of measuring and dispensing small amounts of liquid.

Systems for dispensing measured or metered amounts of liquid are useful for filling bottles and other containers with liquid. It is often necessary to deliver small amounts of liquids in manufacturing, biological testing, and chemical processing, such as chromatography. Recently, pharmaceutical companies have developed a need to dispense very small amounts of liquids, specifically liquid pharmaceuticals. It many cases it is desired that amounts of 10 g or less and even 1 g or less be accurately and repeatedly dispensed in order to fill small vials, syringes, and other containers. However, known systems are, in general, incapable of delivering such small amounts. In addition, these same systems are not readily adaptable for high-speed, mass-production filling of containers. Many of the deficiencies of known systems are due to their reliance on volumetric measuring of the dispensed material.

Thus, there is a need for a measuring and dispensing system which can accurately and repeatedly deliver small amounts of liquids, such as liquid pharmaceuticals, in order to fill containers with same, but which does not rely upon volumetric measurement means.

OBJECTS AND SUMMARY OF THE INVENTION

Therefore, it is an object of the present invention to provide a fluid measuring and dispensing system capable of delivering small amounts of fluids.

A further object of the present invention is to provide a fluid measuring and dispensing system which does not rely on volumetric measurement of the dispensed material.

A further object of the present invention is to provide a fluid measuring and dispensing system that can accurately and repeatedly deliver small amounts of liquids, such as liquid pharmaceuticals, in order to fill containers with same.

These and other objects are achieved in a fluid measuring and dispensing system having a pressurized tank for holding fluid. A mass flow sensor is coupled in fluid transmission relation to the tank, is capable of having fluid from the tank flow through it, and has means for measuring the mass of fluid flowing through it. A system controller is coupled in data transmission relation to the mass flow sensor and records each measurement made by the mass flow sensor. Preferably, the mass flow sensor is mounted on a means for dampening vibration to ensure accurate measurement of fluid flowing through it.

A dispensing means, such as a flexible tube, is coupled in fluid flowing relation to the mass flow sensor. A valve, such as a pinch valve, for controlling flow of fluid out of the dispensing means, is positioned so as to be able to stop flow out of the dispensing means. The valve is coupled in data transmission relation to the system controller. The fluid dispensing system is capable of repeatedly dispensing discrete amounts of fluid having a mass of about 10 g or less, and even amounts as small as 1 g.

As noted, the dispensing means may include a flexible tube. The flexible tube has a first end, coupled in fluid flowing relation to the mass flow sensor, and a second end, having a needle coupled thereto. The pinch valve pinches the flexible tube closed at a predetermined rate, on command from the controller. This ensures that desired discrete amounts of fluid are dispensed.

The system controller may be comprised of a programmable logic controller (PLC) for controlling the valve and a data processing means, such as a personal computer, for analyzing data received from the mass flow sensor.

Further objects and advantages of the present invention will become more apparent from the following detailed description of the invention taken in combination with the accompanying drawings.

BRIEF DESCRIPTION OF THE DRAWINGS

FIG. 1 is schematic diagram of the measuring and dispensing system of the present invention.

FIG. 2 is a cross-sectional view taken along line 2—2 of the mass flow sensor shown in FIG. 1 and a dampening means on which the mass flow sensor is mounted.

DETAILED DESCRIPTION OF THE INVENTION

A measuring and dispensing system 10 is shown in FIG. 1. The system 10 includes a pressurized tank 12. The tank 12 has a refill opening 14 with a cap 15. The tank 12 also includes a second opening 17 which is coupled to a source of pressurized gas (not shown) through a precision gas regulator 18. The gas flow regulator 18 includes an oil dampened gauge 20 and a dump valve 22. Preferably, the tank 12 is a 100 liter stainless steel tank rated for at least 80 psi and the supply of pressurized gas is at a pressure of 87 psi (6 bar). The pressure in the tank 12 is monitored by a pressure sensor 24 which is coupled in data communication through a cable 25 to a system controller 26, discussed in further detail below.

The tank is filled with a medium 30 such as a liquid pharmaceutical. During testing, water; Liposyn II 20%, an oil-based solution; and Etoposide placebo, an alcohol based solution, were used in the system. The system 10 uses pressurized gas to force the medium 30 through it. The purpose of using a pressurized system is to provide a pumping force on the medium that moves the medium without allowing any outside fluid, particles, or other contaminants to enter the system. This is especially important when dispensing pharmaceuticals. Standard pumps with mechanical parts such as propellers, cylinders, etc., are unsuitable because they allow contamination to occur. However, in addition to pressurized gas, peristaltic pumps or gravity systems could be used to provide an appropriate force on the fluid.

The tank 12 has an output or third opening 32 to which a tube 36 is coupled, such as by means of a nipple 34. The tube 36 is coupled at its other end to an input 38 of a mass flow sensor 40, thus coupling the tank 12 and sensor 40 in fluid transmission relation to another. The tube 36 may be made from any suitable material, such as clear PVC. The tube preferably has an inner diameter of approximately 8 mm.

The mass flow sensor 40 has internal tubing (not shown) through which fluid from the tank 12 flows. The mass of the fluid flowing through the tubing is measured by the sensor and this measured amount may be transmitted as an output signal to data processing devices. Suitable sensors may be obtained from Micro Motion Co., Boulder, Colo. under the designations D6 and D12. It was found that the sensors had the characteristics shown in Table 1.

TABLE 1

| SENSOR | D6 | D12 |
| --- | --- | --- |
| flow, min–max: for 100% accuracy | 0.75–15 g/s | 27–605 g/s |
| zero stability: sensor tubing | $1.6 \times 10^6$ g/s | $8.3 \times 10^6$ g/s |
| inner diameter: | 1.5875 mm | 3.175 mm |

As indicated in FIG. 2, the mass flow sensor 40 is mounted on a dampening means 44. For best performance, it was found that the dampening means 44 should be a 4" thick pad, preferably formed of closed cell foam, such as foam available from Dupont under the trademark Styrofoam. The pad 44 preferably has length and width dimensions slightly larger than the length and width dimensions of the sensor 40. Other dampening means such as hydraulic cylinders, springs, etc. may also be suitable. When the sensor 40 is not mounted on some kind of dampening means, its accuracy decreases.

The output signal of the mass flow sensor 40 is transmitted through a communication cable 41 to a transmitter 42. Commercially available sensors are generally equipped with such transmitters. The transmitter 42 provides a signal having a frequency that is proportional to the rate of fluid flowing through the sensor 40. The transmitter also records a running total of the total amount of fluid that has flowed through the sensor 40. The transmitter 42 sends information to and receives information from the controller 26.

The mass flow sensor has a fluid output 46 to which a dispensing means 50 in the form a flexible tube 52 is coupled. Preferably, the flexible tube 52 is a silicone hose having a first end 53 coupled to the mass flow sensor 40, an inner diameter of about 3.175 mm, and an outer diameter of about 6.35 mm. As noted above, the tube 36 has an inner diameter of 8 mm. The dimension of the tubes 36 and 52 must be correlated to the fluid flow through the system 10. Though the dimensions of the tube 36 and 52 may vary with the application at hand, it was found that tubes having the noted inner diameters produced the greatest accuracy when the system 10 was operated with the flow rates indicated in Table 1.

In the preferred embodiment the dispensing means 50 also includes a needle 57 coupled to the second end 55 of the tube 52. Preferably, the needle 57 is constructed from 316 L stainless steel. According to a preferred embodiment of the invention, the needle 57 is a basket needle which splits the flow of fluid into two jets (not shown), each deflected at an angle of approximately 45° with respect to the walls of the container to be filled. Directing the flow of fluid to the walls of the container reduces splashing. As can be seen by reference to Table 2, depending upon predetermined pressures and resulting flow rates, the needle will have an inner diameter according to the dispensing requirements of the application at hand.

TABLE 2

| Amount Dispensed | Inner Diameter (ID) of Filling Needle |
| --- | --- |
| 1 g | 1.5 mm |
| 5 g | 2.5 mm |
| 10 g | 3.5 mm |

As noted above, the transmitter 42 sends an output signal to the system controller 26. The system controller 26 includes a programmable logic controller (PLC) 72, such as an Allen Bradley SLC 500 with a high speed counter card.

The PLC 72 is sometimes referred to as a sub-controller of the system controller 26. The PLC 72 converts the output signal of the transmitter 42 to a digital signal representing the mass of the fluid flowing through the sensor 40. The PLC 72 is capable of receiving an input which indicates the start of a measurement cycle. This input may be manually controlled through user input, such as a switch 73, or may be programmed to occur at a predetermined rate such as once every two seconds. The PLC 72 is programmed to read the mass of fluid flowing through the sensor 40, and compare it to a desired preprogrammed amount, for example, 10 g or 1 g. Once a cycle begins, the PLC 72, through one of more relays 74 (shown schematically in FIG. 1), sends a signal to a pinch valve solenoid (not shown) of a pinch valve 82. The pinch valve 82, which is normally biased closed and, therefore, pinches the tube 52 closed, opens, thereby opening the tube 52 and permitting flow of the medium 30 therethrough. Simultaneously, the PLC 72 reads the mass flowing through the sensor 40 and compares that value to a desired, preprogrammed value in its memory. Once the values are equal or nearly equal the PLC 72 shuts off the control signal to the pinch valve 82, causing the pinch valve to pinch the tube 52 closed.

There is a delay, however, between the time the PLC 72 sends a signal to the valve 82 to close it, and the time when the valve actually closes. To ensure accurate dispensing, this delay is compensated for by programming the PLC in a certain way. Specifically, the PLC 72 is programmed so that it records the amount of fluid dispensed and resets itself for the next cycle. At the beginning of each cycle, the PLC 72 reads the total amount of fluid that has flowed through the sensor 40 from the transmitter 42 and compares that value with the amount it recorded for an individual cycle. The PLC 72 automatically adjusts itself in the next cycle to correct for any discrepancy. For example, if after one cycle the amount of fluid the PLC 72 recorded was 10.3 g and the amount of fluid that flowed through the mass flow sensor, as recorded by the transmitter, was 11 g, the PLC 72 adjusts its timing to shut the pinch valve 82 off slightly before 10 g of fluid flows through the sensor 40 during the next cycle. If the system dispenses less than the desired amount, which might occur if there is an overcompensation for valve delay, the timing may be adjusted so that the valve is held open a for a longer period. This procedure is repeated for each cycle. After several cycles, the amount of adjustment decreases and the system accurately dispenses desired amounts of fluid.

One embodiment of the program or software source code used to operate the PLC 72 is shown in Exhibit A. This source code is written specifically for the Allen-Bradley SLC500 with the high speed counter card.

While it is important that the system 10 be able to compensate for the time delay in closing the pinch valve 82, there is another response delay that must be compensated for. During each filing cycle, the sensor 40 is activated by the flow of fluid through it. The sensor measures the amount of fluid flowing and communicates that amount in real time to the transmitter 42. However, there is a time delay in the communication between the sensor 40 and the transmitter 42. Therefore, at the end of each cycle, there is a delay between the time the sensor measures zero flow and the time that the zero value is reflected at the transmitter. This phenomenon is referred to as "settling." If the sensor 40 is inadvertently disturbed by, for example, pulsation in the fluid in the system caused when the valve 82 closes, settling must occur before accurate measurements can be made. To prevent the sensor from being inadvertently disturbed, the sensor can be set to ignore readings below a certain minimum level. However, decreasing the sensitivity of the sensor 40 decreases its accuracy. Rather than adjust the sensitivity of the sensor 40 to compensate for pulsation, pulsation can be reduced by minimizing the lengths of the tubes 36 and 52. Pulsation may also be minimized if the flexible tubes are used rather than rigid plumbing, because the flexible tubes are better able to absorb motion energy.

The system controller 26 also includes a data processing means in the form of a personal computer 90 coupled in data communication relation to the transmitter 42 through an interface 100 by communication pathways 102 and 104, which may be cables or other similar communication means. The personal computer 90 monitors the measurements made by the sensor 40 and controls the changing of transmitter and sensor settings. Specifically, dampening and cutoff setting adjustments may be made to the transmitter and sensor. The dampening setting affects the calibration of the sensor and it may be adjusted to cause the sensor to be more or less sensitive to fluid flow, depending on the fill volume and flow speed desired.

The cutoff setting is the value at which the sensor stops reading or making measurements. It is preferred that the sensor not measure fluid flow at the end of each fill cycle, because the flow of fluid is very low at this time. The cutoff setting affects the settling time of the sensor in that a high cutoff setting decreases settling time, but also decreases accuracy. In order to make highly accurate readings at high speeds, a balanced relationship must exist between dampening and cutoff. Adjustments must be made bearing in mind that a higher cutoff value decreases the cycling time, but also decreases accuracy in the sensor reading. Adjusting the dampening setting to a high value also decreases the cycling time, but decreases the accuracy of the amount of fluid actually dispensed. Thus, each setting must be adjusted so that a combination of fast cycling, accurate measurement, and accurate filling can be achieved.

The computer 90 may run software such as PROLINK software available from commercial suppliers such as Micro Motion, Boulder, Colo. in order to communicate with transmitter 42. The measurements of the PLC 72 are written into files which may be read using spreadsheet software such as Lotus 1-2-3 or Microsoft Excel.

Due to cost limitations, the present invention was tested using a 486 PC and a separate PLC 72. However, the functions carried out by the computer 90 and PLC 72 may be accomplished using a single, more powerful controller such as a personal computer adapted for industrial applications that also has a more powerful central processor.

As noted earlier, the PLC 72 is coupled in data communication to the pressure sensor 24. The PLC 72 is programmed to operate the system 10 in order to dispense fluid so long as a minimum pressure, and thus a minimum pumping force, is exerted on the fluid. As shown in Table 1, it has been found that that the system 10 operates more effectively under certain pumping force conditions. These conditions may change in relation to the amount and possibly even type of fluid to be dispensed. In the preferred embodiment, the PLC is programmed to shut the system 10 down if the pressure of the gas supplied to the tank 12 drops below 40 psi.

While the present invention has been described in what is believed to be the most preferred forms, it is to be understood that the invention is not confined to the particular construction and arrangement of the components herein illustrated and described, but embraces such modified forms thereof as come within the scope of the appended claims. Although it is preferred that cables, wire, or other similar communication means be used to couple the sensor 40, controller 26, and other components of the system 10, other means of linking the components such as fiber optics, radio transmitter/receiver pairs, or infra-red links may be suitable for some applications of the present invention.

What is claimed is:

1. A fluid dispensing system comprising:
  a tank for holding a fluid;
  a mass flow sensor coupled in fluid transmission relation to the tank so that fluid from the tank flows through the mass flow sensor, the mass flow sensor having means for measuring the mass of fluid flowing through it;
  a system controller coupled in data transmission relation to the mass flow sensor;
  dispensing means coupled in fluid flowing relation to the mass flow sensor and for dispensing the fluid received from the mass flow sensor;
  means for moving the fluid from the tank and through the mass flow sensor and the dispensing means; and
  a valve positioned to control flow of fluid out of the dispensing means, the valve controlled by the system controller.

2. A fluid dispensing system as claimed in claim 1, wherein the system controller is programmed so that the system repeatedly dispenses discrete amounts of fluid having a mass of about 10 g or less.

3. A fluid dispensing system as claimed in claim 1, wherein the mass flow sensor is mounted on a means for dampening vibration.

4. A fluid dispensing system as claimed in claim 1, wherein the dispensing means includes a flexible tube having a first end coupled in fluid flowing relation to the mass flow sensor and a needle coupled to a second end of the flexible tube.

5. A fluid dispensing system as claimed in claim 4, wherein the valve is a pinch valve capable of pinching the flexible tube closed.

6. A fluid dispensing system as claimed in claim 1, wherein the system controller includes a sub-controller for controlling the valve and a data processing means for analyzing data received from the mass flow sensor.

7. A fluid dispensing system as claimed in claim 1, wherein the system controller is programmed so that the system repeatedly dispenses discrete amounts of fluid having a mass of about 1 g.

8. A fluid dispensing system comprising:
  a pressurized tank for holding fluid;
  a mass flow sensor coupled in fluid transmission relation to the tank so that fluid from the tank flows through the mass flow sensor, the mass flow sensor having means for measuring the mass of fluid flowing through it;
  a transmitter coupled in data communication to the mass flow sensor;
  a system controller coupled in data transmission relation to the transmitter;
  a dispensing means coupled in fluid flowing relation to the mass flow sensor; and
  a valve for controlling flow of fluid out of the dispensing means, the valve coupled in data transmission relation to the system controller.

9. A fluid dispensing system as claimed in claim 8, wherein the system controller is programmed so that the system repeatedly dispenses discrete amounts of fluid having a mass of about 10 g or less.

10. A fluid dispensing system as claimed in claim 8, wherein the mass flow sensor is mounted on a means for dampening vibration.

11. A fluid dispensing system as claimed in claim 8, wherein the dispensing means includes a flexible tube having a first end coupled in fluid flowing relation to the mass flow sensor and a needle coupled to a second end of the flexible tube.

12. A fluid dispensing system as claimed in claim 11, wherein the valve is a pinch valve capable of pinching the flexible tube closed.

13. A fluid dispensing system as claimed in claim 8, wherein the system controller includes a sub-controller for controlling the valve and a data processing means for analyzing data received from the mass flow sensor.

14. A fluid dispensing system as claimed in claim 8, wherein the system controller is programmed so that the system repeatedly dispenses discrete amounts of fluid having a mass of about 1 g.

* * * * *